United States Patent
Berger et al.

(10) Patent No.: US 8,380,680 B2
(45) Date of Patent: Feb. 19, 2013

(54) PIECEMEAL LIST PREFETCH

(75) Inventors: Jeffrey Berger, San Jose, CA (US); Terence P. Purcell, Springfield, IL (US); James Z. Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 12/821,801

(22) Filed: Jun. 23, 2010

(65) Prior Publication Data

US 2011/0320415 A1    Dec. 29, 2011

(51) Int. Cl.
G06F 7/00     (2006.01)
G06F 17/00    (2006.01)
G06F 12/00    (2006.01)
G06F 17/30    (2006.01)
G06F 13/00    (2006.01)
G06F 13/28    (2006.01)

(52) U.S. Cl. ........ 707/692; 707/687; 707/690; 707/813; 707/820; 711/133; 711/137

(58) Field of Classification Search .................. None
See application file for complete search history.

(56) References Cited

U.S. PATENT DOCUMENTS

| | | | |
|---|---|---|---|
| 5,305,389 A * | 4/1994 | Palmer | 382/305 |
| 5,485,609 A * | 1/1996 | Vitter et al. | 707/999.101 |
| 5,761,706 A | 6/1998 | Kessler et al. | |
| 5,950,007 A * | 9/1999 | Nishiyama et al. | 717/161 |
| 6,064,625 A | 5/2000 | Tomita | |
| 6,438,646 B1 | 8/2002 | Kitamura et al. | |
| 6,539,458 B2 * | 3/2003 | Holmberg | 711/137 |
| 6,549,907 B1 * | 4/2003 | Fayyad et al. | 707/999.003 |
| 6,606,617 B1 | 8/2003 | Bonner et al. | |
| 6,633,968 B2 | 10/2003 | Zwiegincew et al. | |
| 6,728,726 B1 * | 4/2004 | Bernstein et al. | 707/999.003 |
| 6,915,404 B1 | 7/2005 | Desai et al. | |
| 6,993,629 B2 | 1/2006 | Beardsley et al. | |
| 7,039,766 B1 | 5/2006 | Smith | |
| 7,058,636 B2 | 6/2006 | Coldewey | |
| 7,099,988 B2 | 8/2006 | Dahman et al. | |
| 7,120,759 B2 | 10/2006 | Chiu et al. | |
| 7,206,795 B2 | 4/2007 | Bono | |
| 7,272,612 B2 * | 9/2007 | Birdwell et al. | 707/999.101 |
| 7,418,494 B2 | 8/2008 | Dahlin et al. | |
| 7,440,936 B2 | 10/2008 | Mori | |
| 7,472,256 B1 | 12/2008 | Nair et al. | |
| 2002/0138700 A1 * | 9/2002 | Holmberg | 711/137 |
| 2003/0065888 A1 * | 4/2003 | Nishiyama | 711/137 |
| 2003/0204673 A1 * | 10/2003 | Venkumahanti et al. | 711/137 |

(Continued)

OTHER PUBLICATIONS

"Design and Evaluation of a Compiler Algorithm for Prefetching", by T. C. Mowry et al., Proceedings of the 5th International Conference on Architectural Support for Programming Languages and Operating Systems, pp. 62-73, 1992.*

(Continued)

Primary Examiner — Fred I Ehichioya
Assistant Examiner — Garrett Smith
(74) Attorney, Agent, or Firm — Patterson & Sheridan, LLP (57) ABSTRACT

Prefetching data using a piecemeal list prefetching method. This is achieved by various means, including building a plurality of data pages, sorting the plurality of data pages into sequential data pages and a list of non-sequential pages, prefetching the sequential data pages using a first prefetching technique, and prefetching the non-sequential list of data pages using a second prefetching technique.

17 Claims, 6 Drawing Sheets

U.S. PATENT DOCUMENTS

| | | |
|---|---|---|
| 2006/0074872 A1 | 4/2006 | Gordon |
| 2006/0212658 A1 | 9/2006 | Hrle |
| 2007/0198780 A1 | 8/2007 | Boyd et al. |
| 2008/0082489 A1 | 4/2008 | Chen et al. |
| 2008/0155226 A1 | 6/2008 | Davis et al. |
| 2009/0198738 A1 | 8/2009 | Berger et al. |
| 2009/0198909 A1 | 8/2009 | Speight et al. |

OTHER PUBLICATIONS

Office Action History of U.S. Appl. No. 12/025,801 dated Oct. 8, 2010.

Gu et al.;"A Novel Weighted-Graph-Based Grouping Algorithm for Metadata Prefetching", IEEE Transaction on, vol. 56,Iss. 1, Jan. 2010, pp. 1-15.

Jiang et al.; "An Adaptive Network Prefetch Scheme", IEEE Journal on, vol. 16, Iss. 3, Apr. 1998, pp. 358-368.

Lee et al.; "Adaptive Prefetching Scheme Using Web Log Mining in cLuster-Based Web Systems", IEEE Inter. Conf. on, Jul. 6-10, 2009, pp. 903-910.

Ossa et al.; "Improving Web Prefetching by Making Predictions at Prefetch", 3rd EuroNGI Conference on, May 21-23, 2007, pp. 21-27.

"Index Usage for Performance," Inhouse courses and seminars: DB2 Advanced Development for Performance with V6 & V7 Features, Gabrielle & Associates, 2002, pp. 1-29, <http://web.archive.org/web/20030605092821/www.gabrielledb2.com/iu.pdf>.

"Sorts and List Prefetch," Inhouse courses and seminars: DB2 Advanced Development for Performance with V6 & V7 Features, Gabrielle & Associates, 1984/2004, pp. 1-50, <http://web.archive.org/web/20050513004013/www.gabrielledb2.com/sm.pdf>.

Berger et al., "System and Method for an Adaptive List Prefetch," U.S. Appl. No. 12/025,801, filed Feb. 5, 2008.

\* cited by examiner

PIECEMEAL LIST PREFETCH

BACKGROUND

1. Field

Embodiments of the invention are generally related to prefetching data. And more specifically, embodiments are related to techniques for prefetching data in different ways based on whether the data is sequential or non-sequential.

2. Description of the Related Art

Prefetching generally refers to loading data in anticipation of a subsequent need for the data. Prefetching is commonly used in a variety of different contexts. For instance, computer processors may prefetch instructions, whereas web browsers may prefetch links on the current webpage. As another example, database software applications may prefetch data pages to a data buffer in anticipation of a need for the data pages. In this way, database applications may avoid synchronous I/O, since synchronous I/O may lead to an inefficient use of processor resources and may result in the appearance of sluggish performance (if, for example, the application is stuck waiting on the I/O operation to complete).

SUMMARY

The present disclosure generally relates to prefetching data, and more specifically to prefetching data using a piecemeal list prefetch technique.

One embodiment of the invention provides a computer-implemented method of prefetching data for a database. The method includes determining a plurality of data pages to prefetch, wherein each data page of the plurality of data pages contains one or more rows of data. The method also includes, from the plurality of data pages, identifying a plurality of sequential data pages and a plurality of non-sequential data pages. Additionally, the method includes, for each data page of the plurality of sequential data pages, prefetching the data page into a data buffer using a first prefetching technique. Furthermore, the method includes, for each data page of the plurality of non-sequential data pages, prefetching the data page into the data buffer using a second prefetching technique.

Another embodiment of the invention provides a computer-readable storage medium containing a program that, when executed, performs an operation. The operation includes determining a plurality of data pages to prefetch, wherein each data page of the plurality of data pages contains one or more rows of data. The operation also includes, from the plurality of data pages, identifying a plurality of sequential data pages and a plurality of non-sequential data pages. Additionally, the operation includes, for each data page of the plurality of sequential data pages, prefetching the data page into a data buffer using a first prefetching technique. Furthermore, the operation includes, for each data page of the plurality of non-sequential data pages, prefetching the data page into the data buffer using a second prefetching technique.

Yet another embodiment of the invention provides a system including a computer processor and a memory containing a program that, when executed on the computer processor, performs an operation. The operation includes determining a plurality of data pages to prefetch, wherein each data page of the plurality of data pages contains one or more rows of data. The operation also includes from the plurality of data pages, identifying a plurality of sequential data pages and a plurality of non-sequential data pages. Additionally, the operation includes for each data page of the plurality of sequential data pages, prefetching the data page into a data buffer using a first prefetching technique. Furthermore, the operation includes for each data page of the plurality of non-sequential data pages, prefetching the data page into the data buffer using a second prefetching technique.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide techniques for prefetching data. Generally, data may be prefetched using any of a variety of different algorithms. For instance, list prefetch, or list sequential prefetch, is a way to access data pages efficiently even when the data pages are not contiguous. That is, list prefetch is an effective method of prefetching even when the data pages being retrieved are non-sequential. Another method of prefetching is dynamic prefetching. Dynamic prefetch can reduce paging and improve performance for data accesses that involve contiguous data. However, while dynamic prefetch improves performance for accessing sequential data, it does not perform as well as list prefetch when accessing non-sequential data. Thus, whether a given prefetching algorithm operates efficiently may depend on whether the data being prefetched has certain qualities.

Although these and other prefetching techniques perform most efficiently under certain circumstances, they also may perform poorly under other circumstances. Thus, a software developer attempting to choose a prefetching technique to use for a database application may have to predict which prefetching method will perform most efficiently for a given set of data. This may involve, for example, scanning the set of data to determine its characteristics, and after selecting a prefetching technique to use, recompiling the database application to use the selected prefetching technique. However, in many cases, this may be a very expensive task in terms of time and resources. Furthermore, as these sets of data are often subject to change, a prefetching technique that was very efficient on the original set of data may not perform as efficiently on the modified data set.

The present embodiments perform adaptive prefetching, depending on whether the data is sequential or non-sequential. For example, embodiments of the invention provide a method for creating a list of sequential groups of data pages and a list of non-sequential isolated data pages. Embodiments of the invention may then prefetch the sequential groups of data pages using a first prefetching algorithm, and prefetch the non-sequential data pages using a second prefetching algorithm.

In one embodiment of the invention, a piecemeal list prefetch (PLP) component may determine a plurality of data pages to prefetch. The PLP component may then sort the plurality of data pages and identify any sequential groups of data pages and any non-sequential isolated data pages. Once the plurality of data pages is sorted, the PLP component may then prefetch the sequential groups of data pages into a data buffer using the dynamic prefetch method. Additionally, the PLP component may prefetch the non-sequential data pages into the data buffer using the list prefetch method. Once all the data pages have been prefetched, a database application may process the data in the data buffer.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
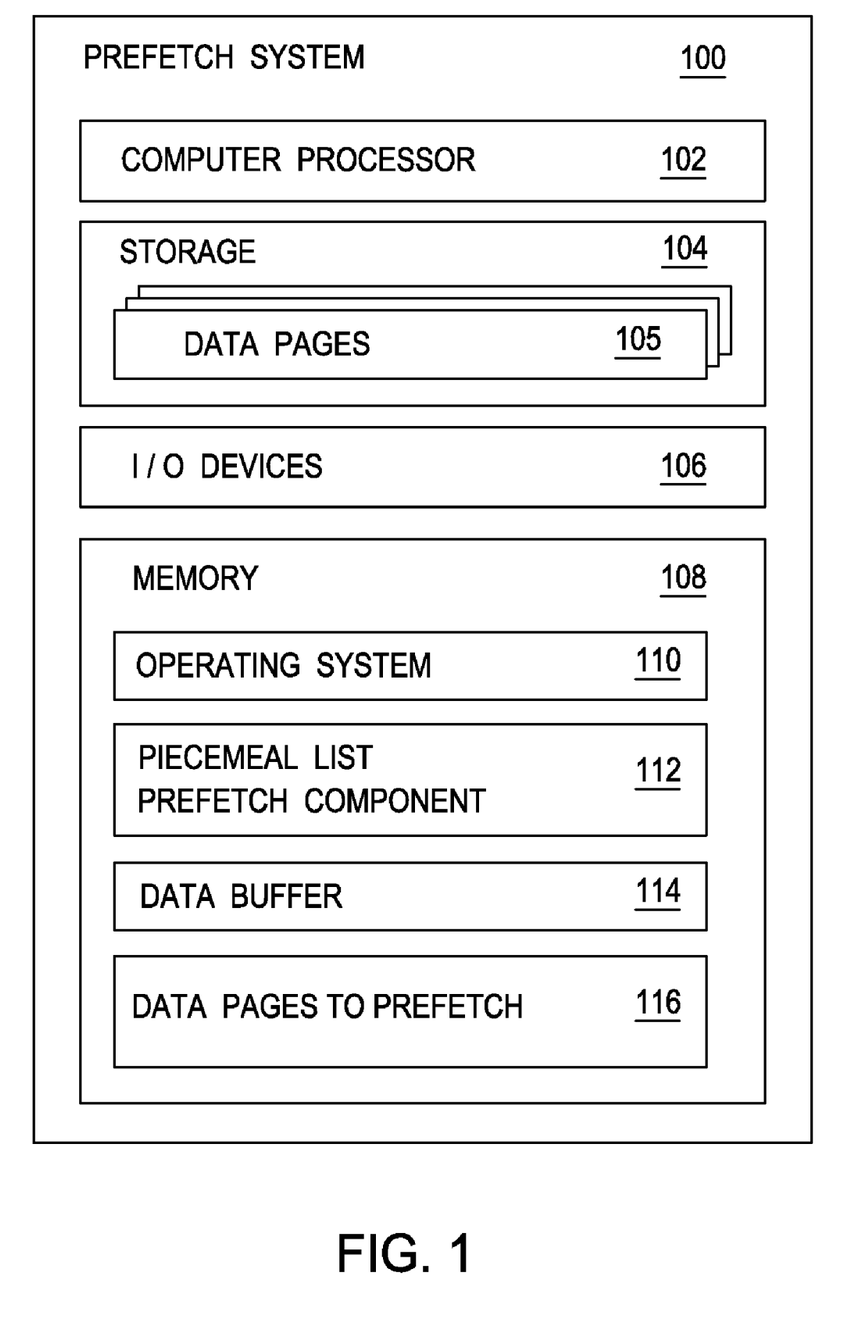
FIG. 1 is a block diagram of components of a computer system configured to run a prefetch component, according to one embodiment of the invention.

Referring now to FIG. 1, FIG. 1 is a block diagram of components of a computer system configured to run a prefetching component, according to one embodiment of the invention. As shown, FIG. 1 includes a computer system 100. The computer system 100 contains a computer processor 102, storage media 104, I/O devices 106 and memory 108. Computer processor 102 may be any processor capable of performing the functions described herein. I/O devices 106 may represent a variety of input and output devices, including keyboards, mice, visual displays, printers and so on. Storage media 104 contains a plurality of data pages 105. The data pages 105 may include one or more rows of data. In one embodiment of the invention, data contained in the data pages 105 is associated with one or more key values in a database. Furthermore, as will be understood by one of ordinary skill in the art, any computer system capable of performing the functions described herein may be used.

In the pictured embodiment, memory 108 contains an operating system 110, a PLP component 112, a data buffer 114 and a plurality of data pages to prefetch 116. Although memory 108 is shown as a single entity, memory 108 may include one or more memory devices having blocks of memory associated with physical addresses, such as random access memory (RAM), read only memory (ROM), flash memory or other types of volatile and/or non-volatile memory. Generally, the plurality of data pages 116 specifies one or more data pages 105 to be prefetched. The PLP component 112 may prefetch data pages 105 from storage 104, based on the determined plurality of data pages 116. The PLP component 112 may then store the prefetched data in the data buffer 114. The operating system 130 may be any operating system capable of performing the functions described herein.

In one embodiment of the invention, the PLP component 112 may determine a plurality of data pages to prefetch 116 for a database management system (DBMS). This determination may be based on historical data usage, relationships between data in the data pages, relationships between data in a database managed by the DBMS, or other factors that may be used to predict which data will subsequently be accessed. Once the plurality of data pages 116 is created, the PLP component 112 may then sort the plurality of data pages 116 into one or more groups of clustered data pages and a list of non-clustered data pages. The PLP component 112 may then prefetch the groups of clustered data pages using a first prefetching technique, and prefetch the list of non-clustered data pages using a second prefetching technique. By doing this, the PLP component 112 may take advantage of any relative strengths of the first and second prefetching techniques.

Figure 2:
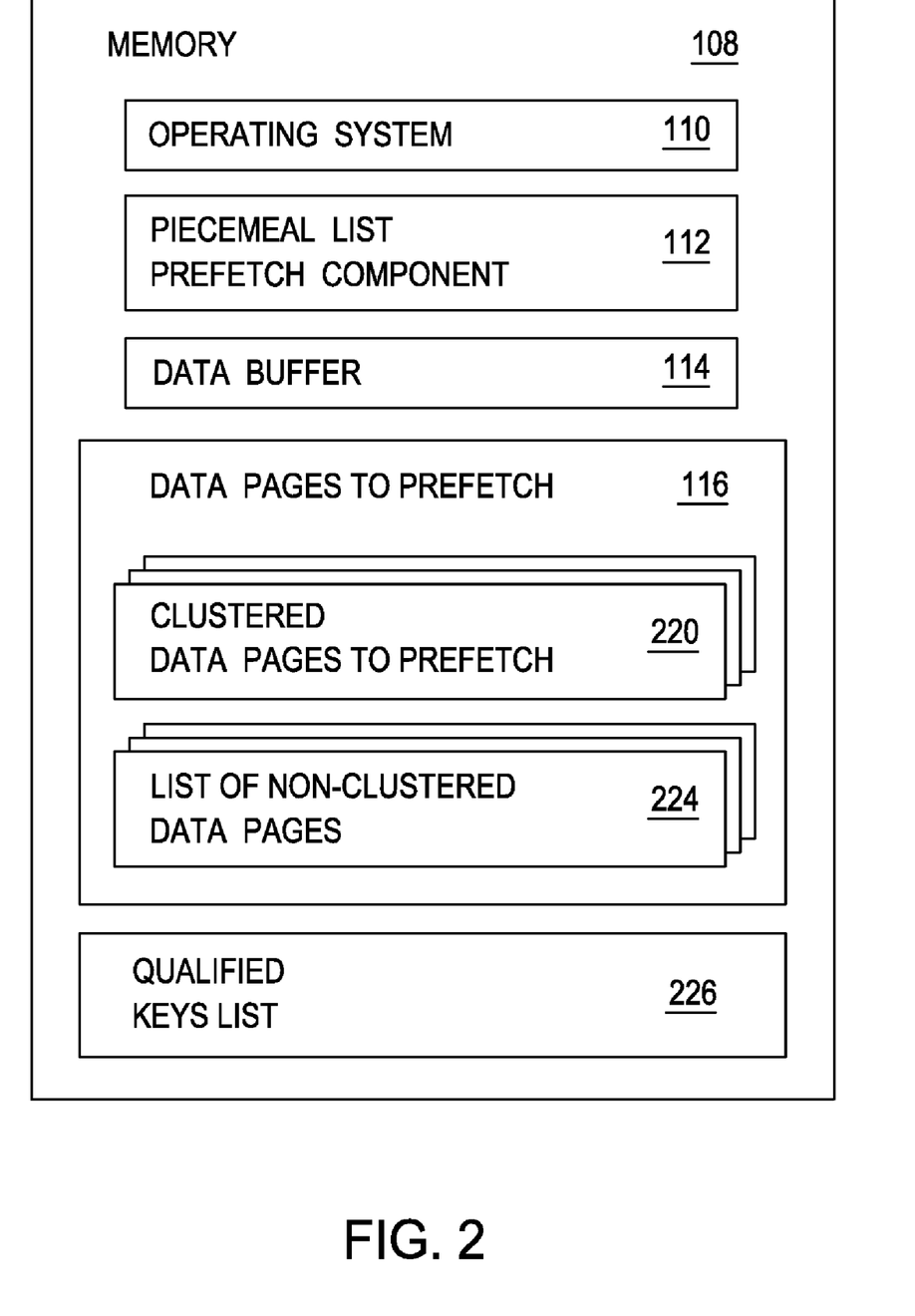
FIG. 2 is a block diagram of a computer memory of the computer system of FIG. 1, according to one embodiment of the invention.

FIG. 2 is a block diagram of a computer memory of the computer system of FIG. 1, according to one embodiment of the invention. As shown, memory 108 contains an operating system 110, a PLP component 112, a data buffer 114, a plurality of data pages to prefetch 116, and a list of qualified keys 226. The plurality of data pages 116 further includes one or more groups of clustered data pages to prefetch 220 and a list of non-clustered data pages 224. The qualified keys list 226 may contain a plurality of keys for which data needs to be prefetched.

In one embodiment, the PLP component 112 first determines which database keys are likely to be accessed in the near future. The PLP component 112 may create the qualified keys list based on the results of this determination. Once the qualified keys list 226 is created, the PLP component 112 may determine, for each key in the qualified keys list 226, where the associated value for the key is stored. In other words, the PLP component 112 may determine which data page contains the qualified row. The PLP component 112 may then add this data page to the plurality of data pages 116, and then repeat this process for every other key in the list of qualified keys 226. Once every key is processed, the PLP component 112 may sort the plurality of data pages 116. The PLP component 112 may then used the sorted plurality of data pages 116 to create the groups of clustered data pages to prefetch 220 and the list of non-clustered data pages 224.

As a simple example, the PLP component 112 may process each key in the qualified keys list 226 and create a plurality of data pages 116 containing data pages "10, 11, 12, 13, 1000, 14, 15, 16, 2000, 17, 18, 1050, 19." The PLP component 112 may then sort the plurality of data pages 116 in sequential order, so that the data pages are ordered "10, 11, 12, 13, 14, 15, 16, 17, 18, 19, 1000, 1050, 2000." Once the data pages are sorted, the PLP component 112 may determine that there is one sequential group of data pages in the list, containing data pages "10, 11, 12, 13, 14, 15, 16, 17, 18, 19." The PLP component 112 may add this group of data pages to the clustered data pages to prefetch 220. Additionally, the PLP component 112 may add the remaining isolated data pages of "1000, 1050, and 2000" to the list of non-clustered data pages 224. The PLP component 112 may then prefetch data pages "10, 11, 12, 13, 14, 15, 16, 17, 18, 19" into the data buffer 114 using a first prefetching technique, and may prefetch data pages "1000, 1050 2000" into the data buffer 114 using a second prefetching technique.

In one embodiment of the invention, the clustered data pages may be prefetched prior to creating the plurality of data pages 116. For example, an exemplary system may use the dynamic prefetch method to anticipatorily prefetch the clustered data pages. Generally, the dynamic prefetch method may use a history for prefetched pages (e.g., historical data about which data pages were prefetched previously) to determine which data pages to prefetch. Furthermore, the history may also contain information about what event (e.g., a particular database query) previously caused a particular data page to be prefetched. For example, assume the history contains data indicating that a particular database query used information contained on data pages 10 through 15. If the same database query is received again, the PLP component 112 may prefetch a range of data pages containing pages 10 through 15. In one embodiment, the size of the range of data pages may be preconfigured (e.g., 10 data pages at a time). Thus, continuing the above example, the clustered data pages "10, 11, 12, 13, 14, 15, 16, 17, 18, 19" may have been previously prefetched using the dynamic prefetch method. In this embodiment, the PLP component 112 may then generate the list of non-clustered data pages 224, and prefetch these data pages using the second prefetching technique (e.g., the list prefetch technique).

As a second example, the PLP component 112 may process each key in the qualified keys list 226 and create a plurality of data pages 116 containing data pages "10, 15, 18, 20, 26, 28, 35, 37, 39, 41, 47, 50." As referred to herein, such a plurality of data pages are known as "skip-sequential" data pages, as the data pages contain no clustered groups, but rather a set of data pages close in proximity to one another. In this example (and much more so in a realistic example containing thousands of data pages), building a single list of non-clustered data pages 224 to prefetch with list prefetch may consume a substantial amount of memory. However, although a dynamic prefetch operation could be performed to prefetch the group of data pages from "10" to "50," such an operation would also prefetch all the unneeded, intermittent pages (e.g., pages 11, 12, 13, 14, 16, etc.). Thus, using only the dynamic prefetch operation may result in increased (and wasteful) disk I/O.

As a result, when encountering skip-sequential sets of data pages, the PLP component 112 may choose to iteratively prefetch subsets of the pages using the list prefetch method. For example, the PLP component 112 may build three sub-lists of non-clustered data pages 224: a first sub-list "10, 15, 18, 20," a second sub-list "26, 28, 35, 37," and a third sub-list "39, 41, 47, 50." The PLP component 112 may then schedule a first prefetch operation using the list prefetch technique for the first sub-list of data pages. Once these pages have been prefetched, the PLP component 112 may schedule a second prefetch operation for the second sub-list of data pages. The data pages in the data buffer 114 from the first prefetch operation may then be processed while the second prefetch operation is performed. In one embodiment, the PLP component 112 may build one sub-list at a time. Thus, in this embodiment, the PLP component 112 may build a first sub-list, schedule a first prefetch operation for the data pages in the first sub-list, and then build the second list of data pages while the first prefetch operation is performed. Of course, in a plurality of data pages 116 containing both clusters of data pages and skip-sequential sets of data pages, the PLP component 112 may use dynamic prefetch for the clusters of data pages, and may generate sub-lists and use list prefetch on the skip-sequential data pages.

The PLP component 112 may determine which prefetching technique to use for the clustered 220 and non-clustered 224 lists based on how well a particular prefetching technique performs against clustered or non-clustered data pages. For example, assume that, in one embodiment, the PLP component 112 is capable of using two prefetching techniques: list prefetch and dynamic prefetch. In this example, further assume that the dynamic prefetch technique performs very well against clustered (sequential) groups of data pages, but performs poorly when prefetching non-clustered (isolated) data pages. Additionally, assume that the list prefetch technique performs very well (relative to the dynamic prefetch technique) against non-clustered data pages, but does not perform as well as the dynamic prefetch technique when prefetching clustered groups of data pages. Thus, in this example, the PLP component 112 may use the dynamic prefetch technique to prefetch the data pages on the groups of clustered data pages 220, and may use list prefetch to prefetch all the remaining isolated data pages on the list of non-clustered data pages 224. By doing this, the PLP component 112 may take advantage of the strengths of both prefetching methods, with the result being increased performance and efficiency in prefetching.

Figure 3:
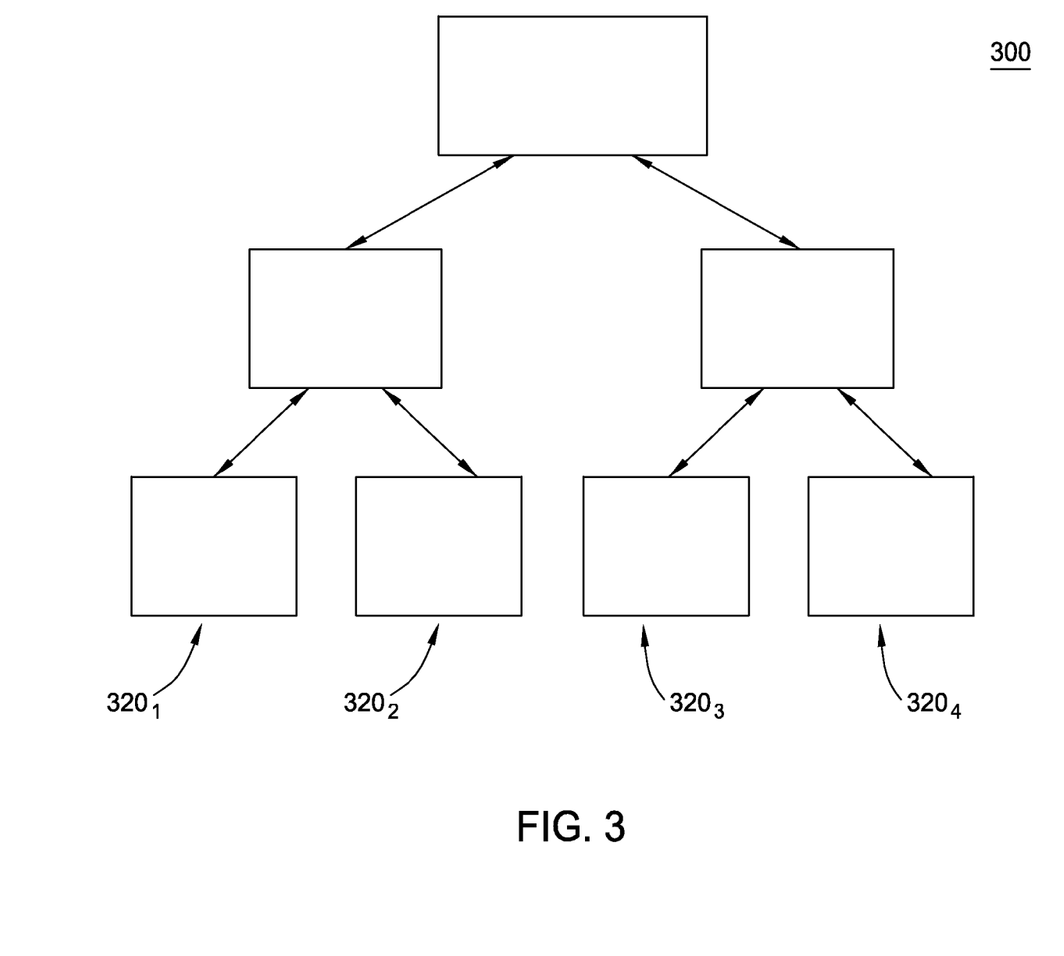
FIG. 3 is an exemplary tree structure for indexing a database table, according to one embodiment of the invention.

FIG. 3 is an exemplary tree structure for indexing a database table, according to one embodiment of the invention. As shown, the tree 300 contains various nodes, including leaf nodes 320. In one embodiment, a DBMS may use the tree 300 to index a plurality of database keys contained in a database table. That is, the tree 300 may include information about each key in the database table and, for each key, may also contain one or more location values. In one embodiment, the location values are represented by a row identifier that specifies a row on a particular data page where the value is stored. The tree 300 may contain a location value for each instance of the key in the database table.

Figure 4:
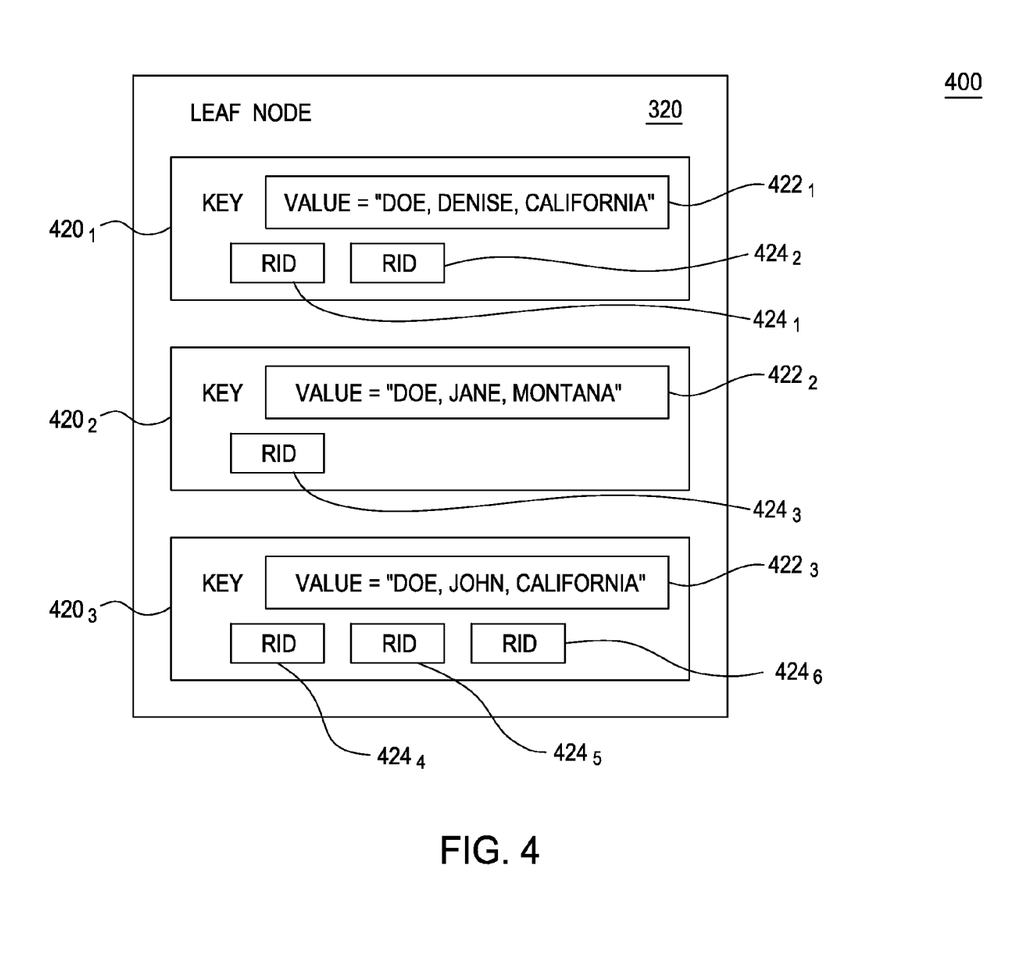
FIG. 4 is a diagram of a leaf node of the tree structure of FIG. 3, according to one embodiment of the invention.

FIG. 4 is a diagram of a leaf node of the tree structure of FIG. 3, according to one embodiment of the invention. In this example, FIG. 4 shows a leaf node 320 of a tree 300 indexing a database table storing phonebook data. More specifically, the database table contains columns "FirstName", "LastName", "State" and "Phone Number". Furthermore, values in the database table (such as the Phone Number value) may be accessed using a key containing "LastName, FirstName, State". As an example, the pictured leaf node 320 contains three exemplary database keys 420. Each key 420 contains a key value 422, and one or more row identifiers 424. As noted above, each row identifier 424 contains a location (e.g., a data page and a row on the data page) where a data value for the key is stored. For example, key $420_1$ contains a key value $422_1$ of "Doe, Denise, California" and row identifiers $424_1$ and $424_2$. In other words, the database table contains data for two people named Denise Doe who live in California. As an additional example, the leaf node 320 also contains key $420_2$, with value $422_2$ of "Doe, Jane, Montana" and a single row identifier $424_3$. Thus, the database table represented by the tree structure 300 in this example only contains data for one person named Jane Doe who lives in Montana. Although the pictured leaf node 320 only contains three key values 420, different sizes of leaf nodes may of course be used.

In one embodiment, the PLP component 112 may process one leaf node 320 at a time. The PLP component 112 may first determine which keys 420 in the leaf node 320 are qualified keys. In other words, if the PLP component 112 determines that rows for a given key 420 will be accessed soon, the PLP component 112 may designate that key as a qualified key and add the key to a list of qualified keys 226. Once the PLP component 112 generates the list of qualified keys 226, the PLP component 112 may determine a plurality of data pages 116 based on the RID values 424 associated with each of the qualified keys. For example, if the PLP component 112 determines that key $420_1$ is a qualified key, the PLP component 112 may then add the data pages associated with RID $424_1$ and RID $424_2$ to the plurality of data pages 116.

This process may continue until every qualified key 420 in the leaf node 320 has been processed. The PLP component 112 may then schedule a prefetch operation for the plurality of data pages 116 using one of the prefetching techniques described herein, and may then begin processing another leaf node 320. In another embodiment, the PLP component 112 may continue adding data pages to the plurality of data pages to prefetch 116 until a certain size limit for the plurality of data pages 116 is reached. The PLP component 112 may then schedule a prefetch operation for the plurality of data pages 116 using one of the prefetching techniques described herein, and may then begin building a second plurality of data pages 116, after the previously list of qualified keys 226 has been processed.

Figure 5:
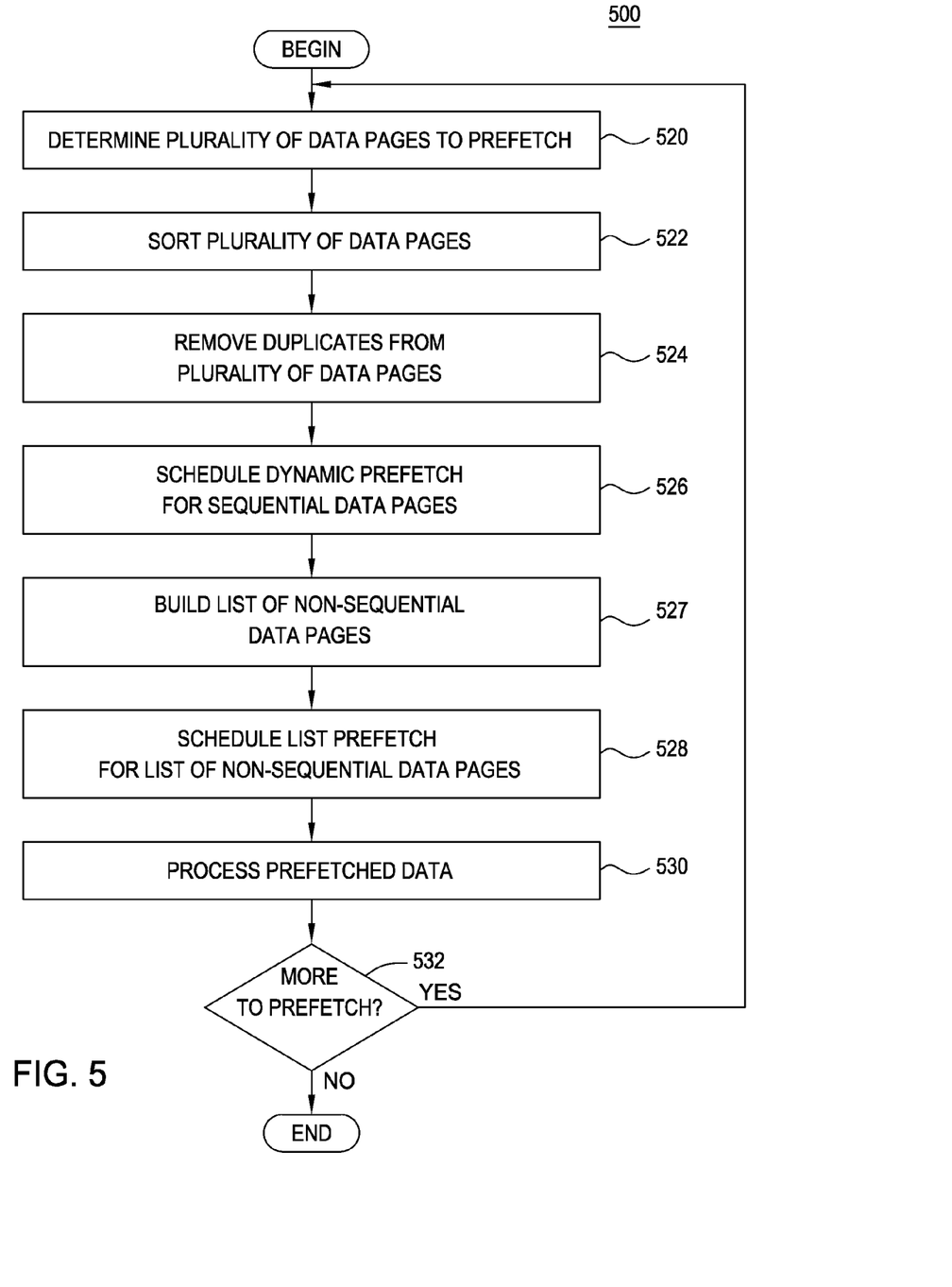
FIG. 5 is a flow diagram illustrating a method of prefetching data, according to one embodiment of the invention.

FIG. 5 is a flow diagram illustrating a method of prefetching data, according to one embodiment of the invention. As shown, the method begins at step 520, where the PLP component 112 determines a plurality of data pages to prefetch 116. In one embodiment, the PLP component 112 may determines the plurality 116 by parsing one or more leaf nodes 320 in an indexing tree structure 300. Once the plurality of data pages 116 is determined, the PLP component 112 sorts the plurality of data pages (step 522). In one embodiment, the PLP component may sort the data pages in sequential order. For example, if the plurality of data pages contains pages "10, 11, 12, 13, 1000, 14, 15, 16, 2000, 17, 18, 1050, 19, 20," the PLP component 112 may sort the plurality of data pages 116 so that the data pages are ordered "10, 11, 12, 13, 14, 15, 16, 17, 18, 19, 20, 1000, 1050, 2000." By sorting the plurality of data pages 116 in this manner, the PLP component 112 may more easily determine clusters of data pages. For instance, in the above example, the PLP component 112 may determine that the plurality of data pages contains a cluster containing pages "10, 11, 12, 13, 14, 15, 16, 17, 18, 19, 20."

Additionally, by sorting the pages in this manner, the PLP component may more easily remove any duplicate entries from the plurality of data pages 116 (step 524). The plurality of data pages 116 may contain duplicate entries because, for example, the plurality 116 may be generated based on row identifiers 424 that specify a data page and a particular row on the data page. Since, in this example, a data page 105 may contain multiple rows of data, different values associated with different keys may be contained on the same data page, but on different rows of the data page. In this example, duplicate entries are removed because when a data page is prefetched, the entirety of the data page is retrieved. That is, since the PLP component 112 prefetches all the rows on the data page 105, the PLP component 112 may actually prefetch the values associated with multiple keys when prefetching a single data page 105. Thus, in this example, it would be redundant and a waste of time and resources to prefetch a particular data page more than once.

Once the duplicate entries are removed from the plurality of data pages 116, the PLP component 112 may then determine one or more groups of clustered data pages 220 and schedule a dynamic prefetch operation for all of the data pages 105 in the groups 220 (step 526). As discussed above, in this example, the dynamic prefetch technique performs more efficiently (relative to the list prefetch technique) on clustered groups of data pages, whereas the list prefetch technique performs more efficiently (relative to the dynamic prefetch technique) on non-clustered isolated data pages. As such, the PLP component 112 may then add the remaining pages in the plurality of data pages 116 to a list of non-clustered data pages 224 (step 527), and schedule a list prefetch operation for all of the pages in the list 224 (step 528). Once all the pages in the plurality of data pages 116 have been prefetched, the DBMS and/or other applications may process the prefetched data in the data buffer (step 530). Once the data in the data buffer is processed, a first iteration of the method ends. The PLP component 112 may then determine if there are more data pages to prefetch (step 532) If the PLP components 112 determines there are more data pages to prefetch, the method begins a second iteration to process a next set of keys, and determines a second plurality of data pages to prefetch (step 520). If no more prefetching is required, this iteration of the method 500 ends.

One advantage to the method 500 is that it is more efficient in terms of time and resources than using either the two prefetching methods (i.e., list prefetch and dynamic prefetch) alone. For example, if only list prefetching was used, the list prefetch method would perform less efficiently against the clustered groups of data pages. Furthermore, because a list containing every page in the plurality of data pages 116 would be created, this would consume substantially more memory resources. On the other hand, if only the dynamic prefetching method was used, the dynamic prefetch method would be unable to efficiently prefetch the isolated non-clustered data pages individually. Furthermore, in some scenarios (such as when the isolated pages are moderately close together), the dynamic prefetching method may prefetch these pages and every data page in between as one cluster. While this may be more efficient than using list prefetch to prefetch each page individually, this results in increased disk I/O resources, as more pages are being prefetched than are required. As such, by splitting the plurality of data pages 116 into groups of clustered data pages 220 and a list of non-clustered data pages 224, the method 500 is able to take advantage of the relative strengths of each of the prefetching techniques.

Figure 6:
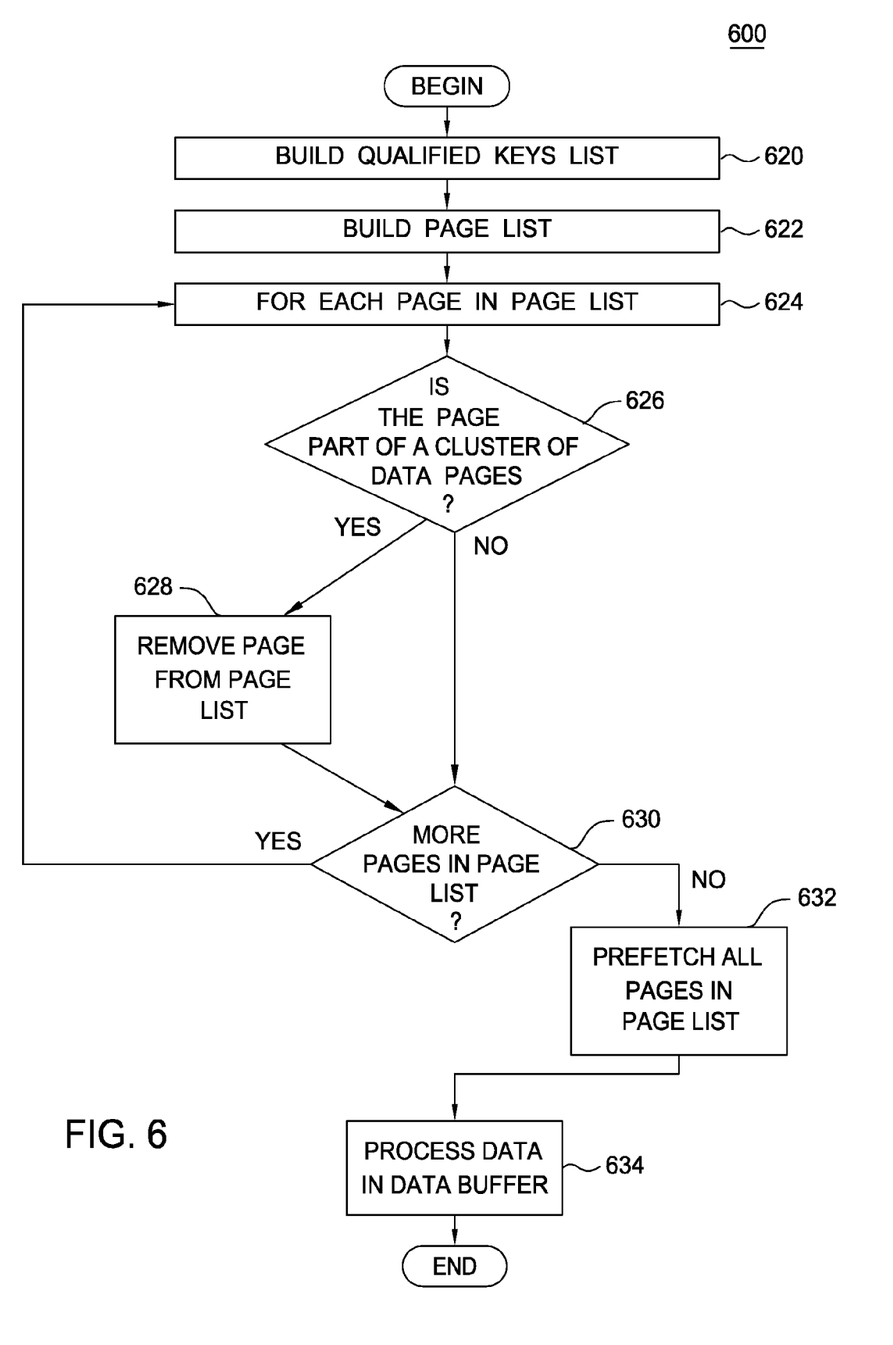
FIG. 6 is a flow diagram illustrating another method of prefetching data, according to one embodiment of the invention.

FIG. 6 is a flow diagram illustrating another method of prefetching data, according to one embodiment of the invention. As shown, the method 600 begins at step 620, where the PLP component 112 builds a list of qualified keys 226. As discussed above, the qualified keys list 226 may generally contain a list of keys to prefetch corresponding rows for. In one embodiment, the PLP component 112 may build this list by processing each key 420 in a leaf node 320 and, for each key 420, determining whether values for the key 420 should be prefetched. Once the list of qualified keys 226 is built, the PLP component 112 determines a list of pages to prefetch 116 (step 622). In one embodiment, the PLP component 112 determines the plurality of data pages 116 by iterating through keys in the qualified keys list 226, and for each key, determining one or more data pages that contain values for the key. The PLP component 112 may then add these determined data pages to the plurality of data pages 116.

The method 600 then enters a loop (step 624) and for each page in the plurality of data pages 116, the PLP component 112 determines whether the page is part of a cluster of data pages (step 626). If the PLP component 112 determines that the page is part of a cluster of data pages, the PLP component 112 removes the page from the plurality of data pages to prefetch 116 (step 628). In one embodiment, the PLP component 112 may separately initiate a prefetch operation for the entire cluster of data pages. The PLP component 112 then determines whether there are more pages in the plurality of data pages to prefetch 116 (step 630). If the PLP component 112 determines there are more pages in the plurality of data pages 116, the loop begins again (step 624), with the PLP component determining whether the page is part of a cluster of data pages (step 626). If instead the PLP component 112 determines there are no more pages in the plurality of data pages 116 left to process, the PLP component 112 prefetches all the remaining pages in the page list (step 632). In one embodiment, the PLP component 112 prefetches all the remaining pages in the page list using the list prefetch technique. Once all the data pages have been prefetched, the database and/or other applications may process the prefetched values now in the data buffer 114 (step 634). Once the values in the data buffer 114 are processed, the iteration of the method 600 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of prefetching data for a database, comprising:

determining, by operation of one or more computer processors, a plurality of data pages to prefetch, wherein each data page of the plurality of data pages contains one or more rows of data;

identifying, from the plurality of data pages, (i) a plurality of sequential data pages and (ii) a plurality of non-sequential data pages that is mutually exclusive from the plurality of sequential data pages, comprising:

sorting the plurality of data pages in sequential order;

identifying clustered data pages in the sorted plurality of data pages as the plurality of sequential data pages; and identifying remaining data pages in the sorted plurality of data pages as the plurality of non-sequential data pages;

for each data page of the plurality of sequential data pages, prefetching the data page into a data buffer using a first prefetching technique; and for each data page of the plurality of non-sequential data pages, prefetching the data page into the data buffer using a second prefetching technique.

2. The method of claim 1, further comprising:
processing each prefetched data page in the data buffer.

3. The method of claim 1, wherein determining a plurality of data pages to prefetch comprises:

generating a list of qualified keys to prefetch;

for each key in the list of qualified keys, determining a corresponding data page on which a value for the key is stored; and adding the associated data page to the plurality of data pages to prefetch.

4. The method of claim 1, further comprising:
removing one or more duplicate data pages from the plurality of data pages.

5. The method of claim 1, wherein determining the plurality of data pages to prefetch comprises:

parsing a leaf node in a tree structure, wherein the leaf node contains a plurality of keys, and wherein each key in the plurality of keys is associated with one or more row identifiers;

determining one or more qualified keys from the plurality of keys that are likely to be accessed within a predetermined period of time; and for each qualified key in the one or more qualified keys, adding one or more qualified data pages to the one or more data pages to prefetch, based on the one or more row identifiers associated with the qualified key.

6. The method of claim 1, wherein the plurality of sequential data pages contains one or more groups of consecutive data pages, and wherein the plurality of non-sequential data pages contains one or more isolated data pages.

7. A non-transitory computer-readable medium containing a program that, when executed, performs an operation, comprising:

determining a plurality of data pages to prefetch, wherein each data page of the plurality of data pages contains one or more rows of data;

identifying, from the plurality of data pages, (i) a plurality of sequential data pages and (ii) a plurality of non-sequential data pages that is mutually exclusive from the plurality of sequential data pages, comprising:

sorting the plurality of data pages in sequential order;

identifying clustered data pages in the sorted plurality of data pages as the plurality of sequential data pages; and identifying remaining data pages in the sorted plurality of data pages as the plurality of non-sequential data pages;

for each data page of the plurality of sequential data pages, prefetching the data page into a data buffer using a first prefetching technique; and for each data page of the plurality of non-sequential data pages, prefetching the data page into the data buffer using a second prefetching technique.

8. The non-transitory computer-readable medium of claim 7, the operation further comprising:
processing each prefetched data page in the data buffer.

9. The non-transitory computer-readable medium of claim 7, wherein determining a plurality of data pages to prefetch comprises:

generating a list of qualified keys to prefetch;

for each key in the list of qualified keys, determining a corresponding data page on which a value for the key is stored; and adding the associated data page to the plurality of data pages to prefetch.

10. The non-transitory computer-readable medium of claim 7, the operation further comprising:

removing one or more duplicate data pages from the plurality of data pages.

11. The non-transitory computer-readable medium of claim 7, wherein determining the plurality of data pages to prefetch comprises:

parsing a leaf node in a tree structure, wherein the leaf node contains a plurality of keys, and wherein each key in the plurality of keys is associated with one or more row identifiers;

determining one or more qualified keys from the plurality of keys that are likely to be accessed within a predetermined period of time; and for each qualified key in the one or more qualified keys, adding one or more qualified data pages to the one or more data pages to prefetch, based on the one or more row identifiers associated with the qualified key.

12. The non-transitory computer-readable medium of claim 7, wherein the plurality of sequential data pages contains one or more groups of consecutive data pages, and wherein the plurality of non-sequential data pages contains one or more isolated data pages.

13. A system, comprising:
a computer processor; and
a memory containing a program that, when executed on the computer processor, performs an operation, comprising:

determining a plurality of data pages to prefetch, wherein each data page of the plurality of data pages contains one or more rows of data;

identifying, from the plurality of data pages, (i) a plurality of sequential data pages and (ii) a plurality of non-sequential data pages that is mutually exclusive from the plurality of sequential data pages, comprising:

sorting the plurality of data pages in sequential order;
sorting the plurality of data pages in sequential order;

identifying clustered data pages in the sorted plurality of data pages as the plurality of sequential data pages; and identifying remaining data pages in the sorted plurality of data pages as the plurality of non-sequential data pages;

for each data page of the plurality of sequential data pages, prefetching the data page into a data buffer using a first prefetching technique; and for each data page of the plurality of non-sequential data pages, prefetching the data page into the data buffer using a second prefetching technique.

14. The system of claim 13, the operation further comprising:

processing each prefetched data page in the data buffer.

15. The system of claim 13, wherein determining a plurality of data pages to prefetch comprises:

generating a list of qualified keys to prefetch;

for each key in the list of qualified keys, determining a corresponding data page on which a value for the key is stored; and adding the associated data page to the plurality of data pages to prefetch.

16. The system of claim 13, the operation further comprising:

removing one or more duplicate data pages from the plurality of data pages.

17. The system of claim 13, wherein determining the plurality of data pages to prefetch comprises:

parsing a leaf node in a tree structure, wherein the leaf node contains a plurality of keys, and wherein each key in the plurality of keys is associated with one or more row identifiers;

determining one or more qualified keys from the plurality of keys that are likely to be accessed within a predetermined period of time; and for each qualified key in the one or more qualified keys, adding one or more qualified data pages to the one or more data pages to prefetch, based on the one or more row identifiers associated with the qualified key.

* * * * *